(12) United States Patent
Kanj et al.

(10) Patent No.: US 9,478,863 B2
(45) Date of Patent: Oct. 25, 2016

(54) NEAR FIELD COMMUNICATION ANTENNA

(75) Inventors: Houssam Kanj, Waterloo (CA); Shirook M. Ali, Waterloo (CA)

(73) Assignee: BlackBerry Limited, Waterloo (CA)

( * ) Notice: Subject to any disclaimer, the term of this patent is extended or adjusted under 35 U.S.C. 154(b) by 347 days.

(21) Appl. No.: 14/127,570

(22) PCT Filed: Jun. 20, 2011

(86) PCT No.: PCT/CA2011/050371
§ 371 (c)(1),
(2), (4) Date: Dec. 19, 2013

(87) PCT Pub. No.: WO2012/174634
PCT Pub. Date: Dec. 27, 2012

(65) Prior Publication Data
US 2014/0125538 A1    May 8, 2014

(51) Int. Cl.
| | |
|---|---|
| *H01Q 7/06* | (2006.01) |
| *H01Q 7/00* | (2006.01) |
| *G06K 19/077* | (2006.01) |
| *H01Q 1/20* | (2006.01) |
| *H01Q 1/22* | (2006.01) |
| *H01Q 1/24* | (2006.01) |

(52) U.S. Cl.
CPC ............ *H01Q 7/06* (2013.01); *G06K 19/0779* (2013.01); *G06K 19/07779* (2013.01); *H01Q 1/20* (2013.01); *H01Q 1/2291* (2013.01); *H01Q 1/243* (2013.01); *H01Q 7/00* (2013.01); *Y10T 29/49016* (2015.01)

(58) Field of Classification Search
CPC ............ H01Q 7/06; G06K 19/07779; G06K 19/0779
See application file for complete search history.

(56) References Cited

U.S. PATENT DOCUMENTS

| | | | |
|---|---|---|---|
| 8,294,629 B2 | 10/2012 | Yosui et al. | |
| 2005/0001779 A1* | 1/2005 | Copeland | H01Q 7/00 343/867 |
| 2005/0242959 A1 | 11/2005 | Watanabe | |

(Continued)

FOREIGN PATENT DOCUMENTS

| | | |
|---|---|---|
| DE | 102009038824 | 3/2010 |
| EP | 2146413 A1 | 1/2010 |

(Continued)

OTHER PUBLICATIONS

International Search Report on International Application No. PCT/CA2011/050371, mailed Feb. 22, 2012.
International Search Report and Written Opinion on International Application No. PCT/CA2011/050371, mailed Mar. 7, 2012.
European Patent Office, Examination Report, Application No. 11868089.1-1806, May 22, 2015.

(Continued)

*Primary Examiner* — Hoang V Nguyen
*Assistant Examiner* — Michael Bouizza
(74) *Attorney, Agent, or Firm* — Moffat & Co.

(57) ABSTRACT

Devices and methods are disclosed for providing an improved antenna for NFC mobile devices. Embodiments of the disclosure provide an antenna configuration that makes it possible to establish an NFC link when an NFC mobile device is oriented in ergonomic positions that are desirable for a user. In various embodiments, the NFC antenna is folded and wrapped around a portion of the case of a mobile wireless device. Using the NFC antenna disclosed herein, an NFC link can be established regardless of the orientation of the NFC wireless mobile device and another NFC device, as long as the antenna-bearing end of the wireless mobile device is pointed toward the antenna of the other NFC device.

18 Claims, 9 Drawing Sheets

(56) References Cited

U.S. PATENT DOCUMENTS

2007/0029385 A1    2/2007    Kovac et al.
2010/0053014 A1    3/2010    Yosui et al.

FOREIGN PATENT DOCUMENTS

JP      2005033461 A   *   2/2005  ....... G06K 19/07771
WO     0215139 A1     2/2002

OTHER PUBLICATIONS

Extended European Search Report on European Application No. 11868089.1, dated May 12, 2014.

European Patent Office, Office action on Application No. 11868089.1, issued Nov. 10, 2015.

* cited by examiner

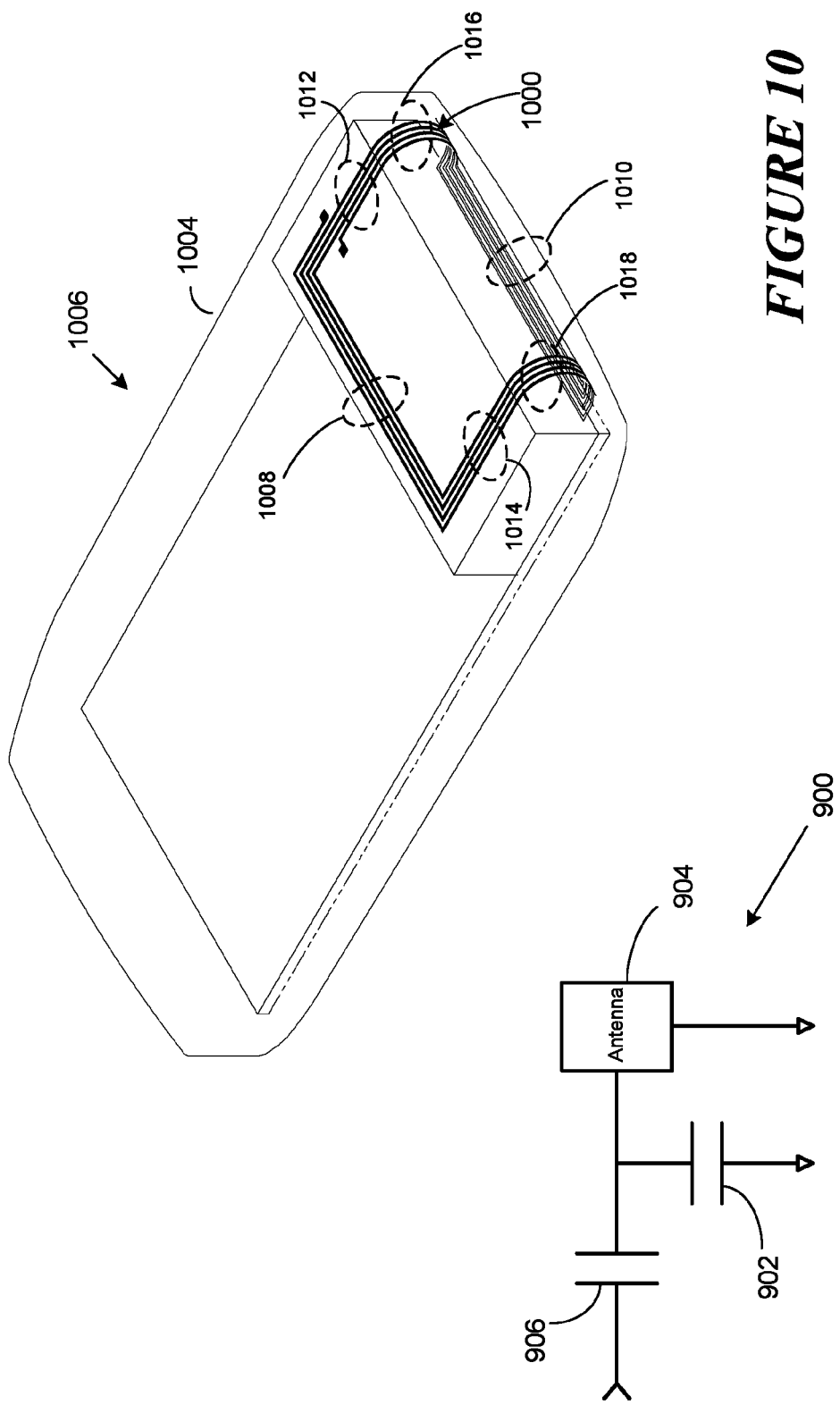

NEAR FIELD COMMUNICATION ANTENNA

BACKGROUND OF THE INVENTION

1. Field of the Invention

The present invention is directed in general to communications systems and methods for operating same. In one aspect, the present invention relates to systems and methods for using a near field antenna in a mobile wireless device.

2. Description of the Related Art

Near Field Communication (NFC) is a short-range wireless communication technology that is being developed for interactive use in consumer electronics, mobile devices and PCs. This technology enables the exchange of data between two devices in close proximity and is an extension of the ISO/IEC 14443 proximity-card standard for radio frequency identification devices (RFID) that combines the interface of a smartcard and a reader into a single device. The effective range of these devices is just a few centimeters; however, that distance makes it possible to activate the link without contact. Alternatively, the systems can be designed to require light contact to activate the link. There is increasing interested in using NFC systems in wireless mobile systems for numerous applications, such as electronic keys, mobile payment and ticketing and electronic financial transactions.

The most ergonomic way of using a NFC equipped mobile device, i.e., by pointing the device as a "magic wand," where some angulations (θ) exist between the NFC mobile device and the other NFC capable device. However, this assumes that this configuration is technologically feasible. This also assumes that there is no necessity for the mobile NFC device to be aligned (parallel) with the NFC capable device. In reality, this is not true. The NFC antenna is typically placed on the battery back door, and to activate the NFC link, it is necessary to hold the mobile phone against the NFC capable device and in a perfectly aligned way such that the Tx and the Rx coils electromagnetically couple.

In view of the foregoing it is apparent that there is a need for an improved antenna configuration for use in NFC mobile devices.

BRIEF DESCRIPTION OF THE DRAWINGS

The present invention may be understood, and its numerous objects, features and advantages obtained, when the following detailed description is considered in conjunction with the following drawings, in which:

FIG. 9 is an illustration of an antenna matching circuit for use with embodiments of the NFC antenna of the present disclosure;

FIG. 10 shows an embodiment of the NFC antenna in an arched configuration as described in more detail hereinbelow.

DETAILED DESCRIPTION

Figure 1:
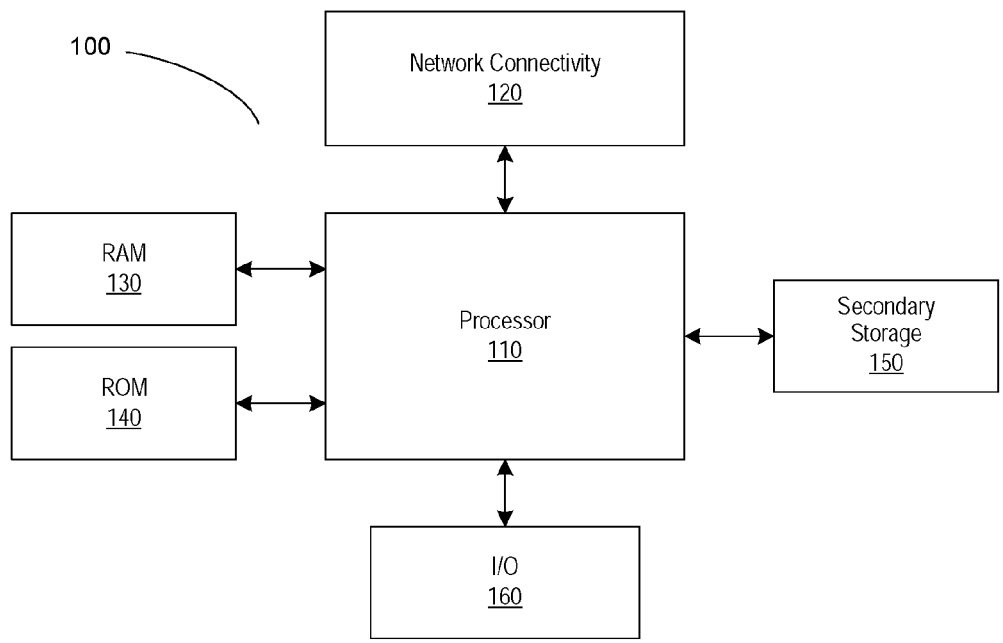
FIG. 1 shows an exemplary system in which the present invention may be implemented.

Devices and methods for providing an improved antenna for NFC mobile devices are disclosed herein. Embodiments of the invention provide an antenna configuration that makes it possible to establish an NFC link when an NFC mobile device is oriented in ergonomic positions that are desirable for a user. In various embodiments, the NFC antenna is folded and wrapped around a portion of the case of a mobile wireless device. Using the NFC antenna disclosed herein, an NFC link can be established regardless of the orientation of the NFC wireless mobile device and another NFC device, as long as the antenna-bearing end of the wireless mobile device is pointed toward the antenna of the other NFC device.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, software, a combination of hardware and software, or software in execution. For example, a component may be, but is not limited to being, an object, a processor, a process running on a processor, an executable, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points. Examples of Internet or Intranet nodes include host computers identified by an Internet Protocol (IP) address, bridges and WLAN access points. Likewise, examples of nodes in cellular communication include base stations, relays, base station controllers, home location registers, Gateway GPRS Support Nodes (GGSN), and Serving GPRS Support Nodes (SGSN).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiFi, WiMAX, etc) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. As likewise used herein, a client node communicating with an access node associated with a macrocell is referred to as a "macrocell client." Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity interfaces 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity interfaces 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity interfaces 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 120 may enable the processor 110 to communicate with the Internet or one or more telecommunications networks or other networks from which the processor 110 might receive information or to which the processor 110 might output information.

The network connectivity interfaces 120 may also be capable of transmitting or receiving data wirelessly in the form of electromagnetic waves, such as radio frequency signals or microwave frequency signals. Information transmitted or received by the network connectivity interfaces 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may likewise be used to store instructions and data that is read during execution of the instructions. The secondary storage 150 is typically comprised of one or more disk drives or tape drives and may be used for non-volatile storage of data or as an overflow data storage device if RAM 130 is not large enough to hold all working data. Secondary storage 150 may likewise be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
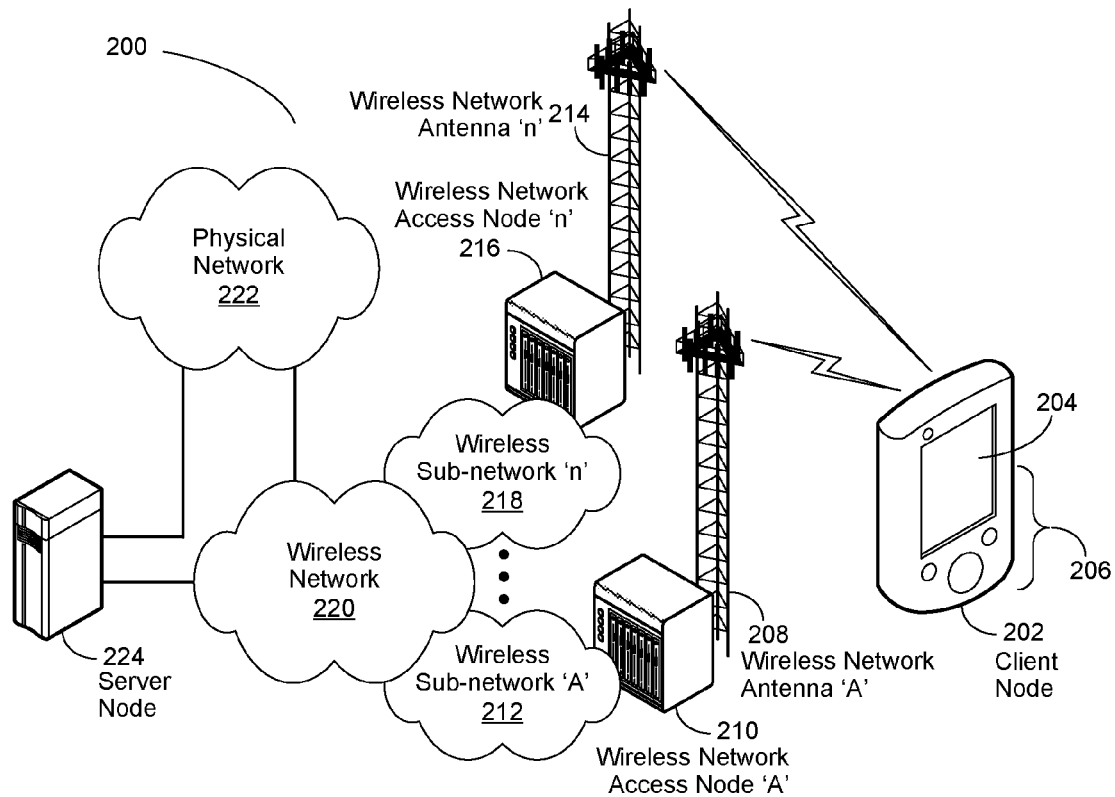
FIG. 2 shows a wireless-enabled communications environment including an embodiment of a client node.

FIG. 2 shows a wireless-enabled communications environment including an embodiment of a client node as implemented in an embodiment of the invention. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. As used herein, a wireless network 220 broadly refers to any network using at least one wireless connection between two of its nodes. The various applications may likewise be obtained from a peer client node 202 or other system over a connection to the wireless network 220 or any other wirelessly-enabled communication network or system.

In various embodiments, the wireless network 220 comprises a plurality of wireless sub-networks (e.g., cells with corresponding coverage areas) 'A' 212 through 'n' 218. As used herein, the wireless sub-networks 'A' 212 through 'n' 218 may variously comprise a mobile wireless access network or a fixed wireless access network. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. As used herein, the network access nodes 'A' 210 through 'n' 216 broadly refer to any access node of a wireless network. As shown in FIG. 2, the wireless network access nodes 'A' 210 through 'n' 216 are respectively coupled to wireless sub-networks 'A' 212 through 'n' 218, which are in turn connected to the wireless network 220.

In various embodiments, the wireless network 220 is coupled to a physical network 222, such as the Internet. Via the wireless network 220 and the physical network 222, the client node 202 has access to information on various hosts, such as the server node 224. In these and other embodiments, the server node 224 may provide content that may be shown on the display 204 or used by the client node processor 110 for its operations. Alternatively, the client node 202 may access the wireless network 220 through a peer client node 202 acting as an intermediary, in a relay type or hop type of connection. As another alternative, the client node 202 may be tethered and obtain its data from a linked device that is connected to the wireless network 212. Skilled practitioners of the art will recognize that many such embodiments are possible and the foregoing is not intended to limit the spirit, scope, or intention of the disclosure.

Figure 3:
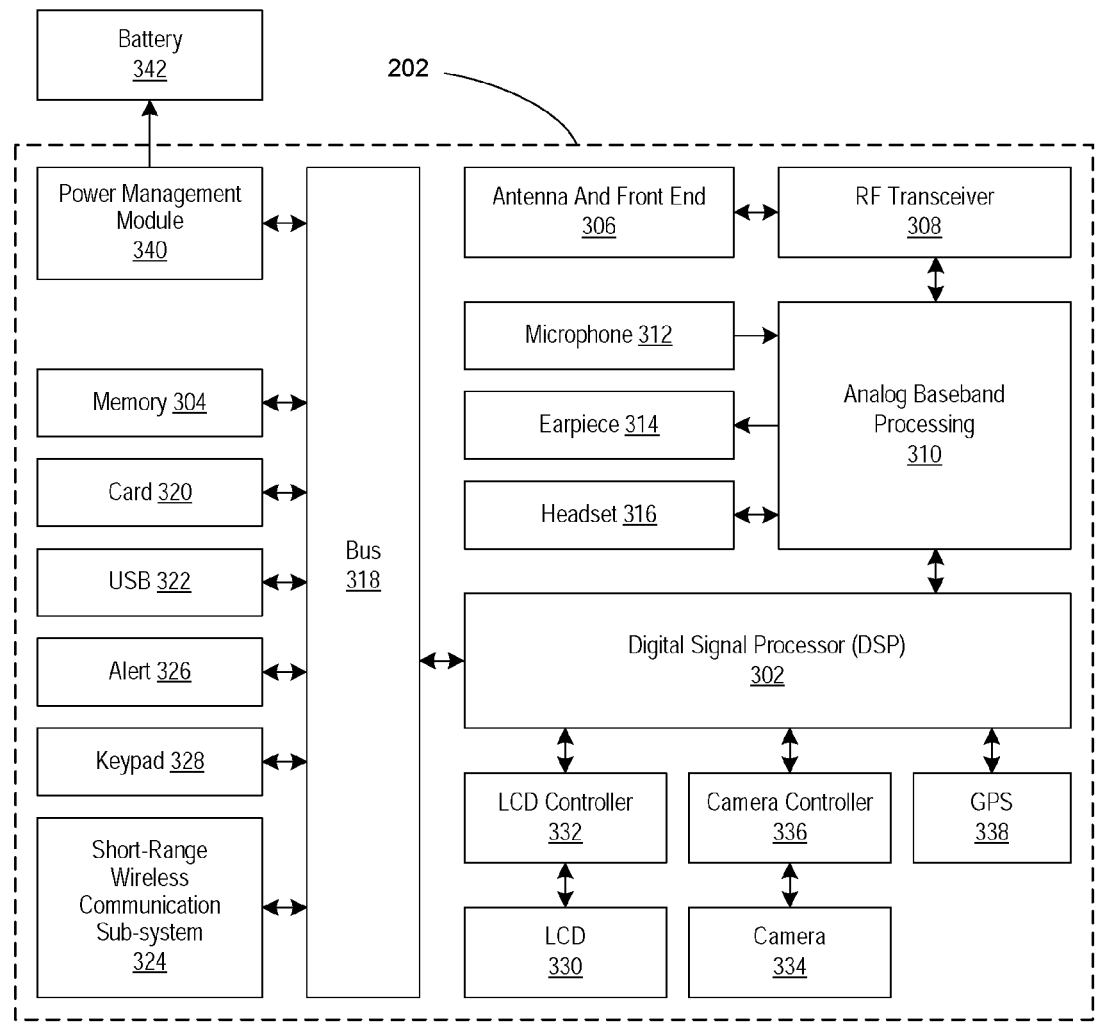
FIG. 3 is a simplified block diagram of an exemplary client node comprising a digital signal processor (DSP)

FIG. 3 depicts a block diagram of an exemplary client node as implemented with a digital signal processor (DSP) in accordance with an embodiment of the invention. While various components of a client node 202 are depicted, various embodiments of the client node 202 may include a subset of the listed components or additional components not listed. As shown in FIG. 3, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202 may include another kind of display that does not provide a touch sensitive screen. In one embodiment, the DSP 302 communicates directly with the memory 304 without passing through the input/output interface 318.

In various embodiments, the DSP 302 or some other form of controller or central processing unit (CPU) operates to control the various components of the client node 202 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the client node 202 to send and receive information from a cellular network or some other available wireless communications network or from a peer client node 202. In an embodiment, the antenna and front end unit 106 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 306 may include antenna tuning or impedance matching components, RF power amplifiers, or low noise amplifiers.

In various embodiments, the RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes.

The input/output interface 318 may further connect the DSP 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the I/O interface 318 to provide one mechanism for the user to make selections, enter information, and otherwise provide input to the client node 202. The keyboard 328 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals or other navigational signals, thereby enabling the client node 202 to determine its position. Various other peripherals may also be included to provide additional functions, such as radio and television reception.

Figure 4:
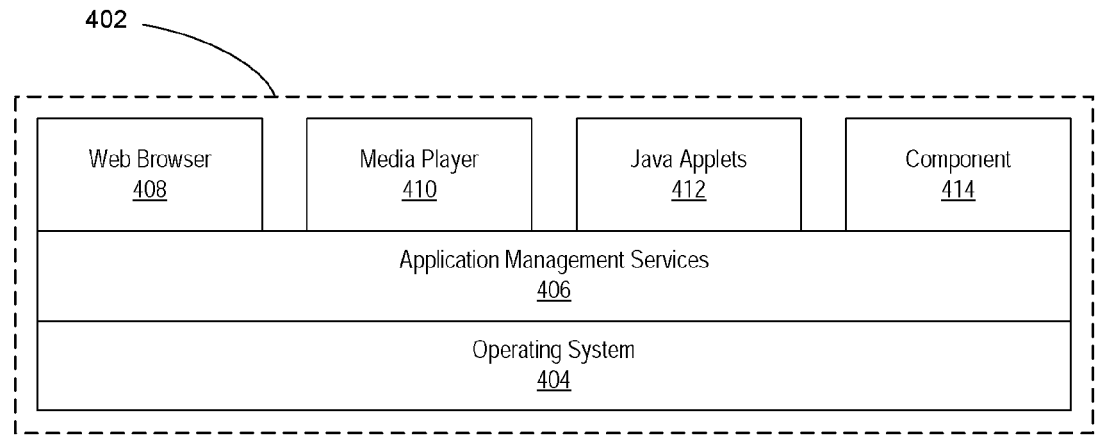
FIG. 4 is a simplified block diagram of a software environment that may be implemented by a DSP.

FIG. 4 illustrates a software environment 402 that may be implemented by a digital signal processor (DSP). In this embodiment, the DSP 302 shown in FIG. 3 executes an operating system 404, which provides a platform from which the rest of the software operates. The operating system 404 likewise provides the client node 202 hardware with standardized interfaces (e.g., drivers) that are accessible to application software. The operating system 404 likewise comprises application management services (AMS) 406 that transfer control between applications running on the client node 202. Also shown in FIG. 4 are a web browser application 408, a media player application 410, and Java applets 412. The web browser application 408 configures the client node 202 to operate as a web browser, allowing a user to enter information into forms and select links to retrieve and view web pages. The media player application 410 configures the client node 202 to retrieve and play audio or audiovisual media. The Java applets 412 configure the client node 202 to provide games, utilities, and other functionality. A component 414 may provide functionality described herein. In various embodiments, the client node 202, the wireless network nodes 'A' 210 through 'n' 216, and the server node 224 shown in FIG. 2 may likewise include a processing component that is capable of executing instructions related to the actions described above.

Figure 5:
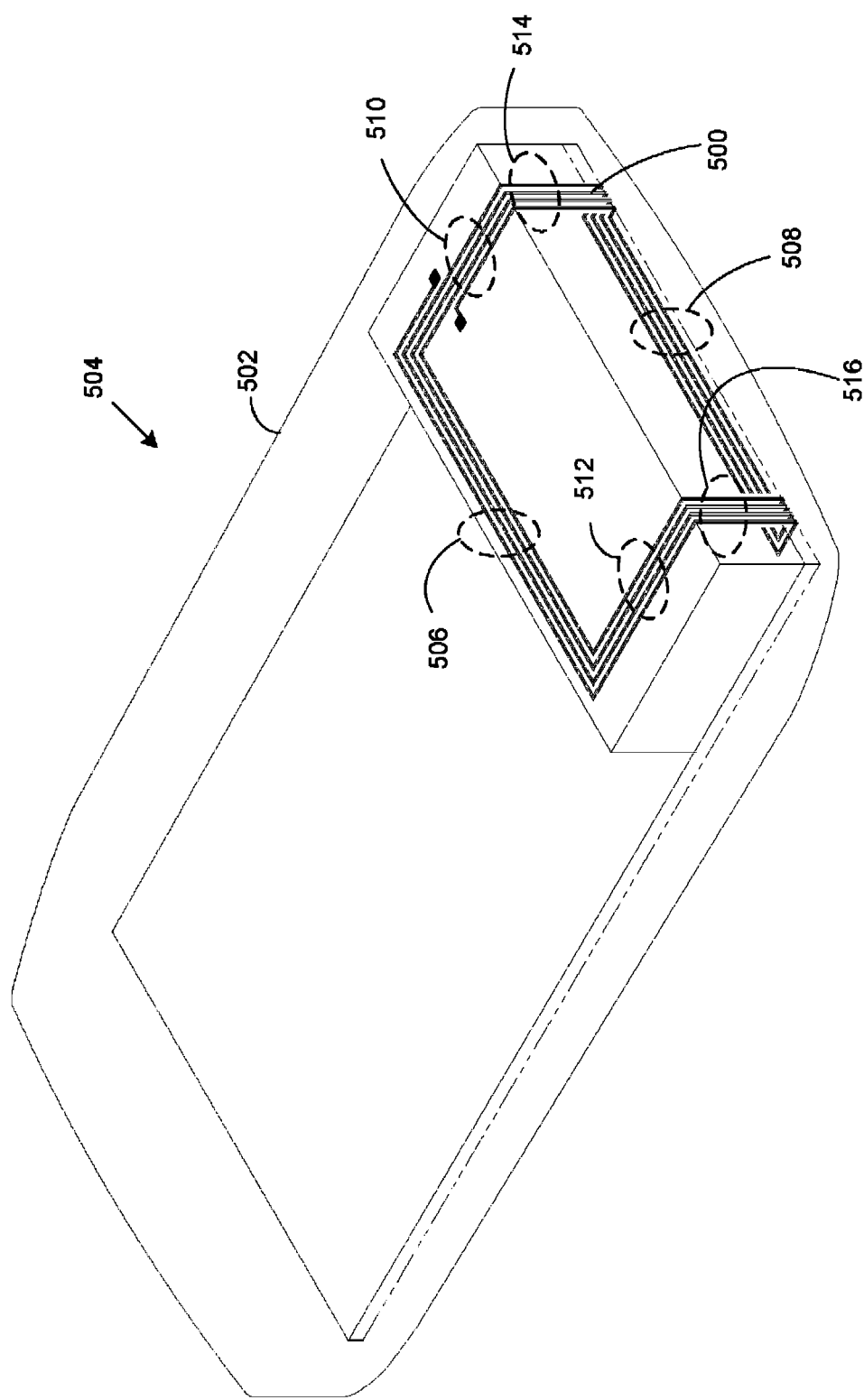
FIG. 5 is an illustration of an embodiment of a NFC antenna disposed on the case of a mobile communication device.

FIG. 5 is an illustration of an embodiment of an NFC antenna 500 disposed within, or on the surface of, a housing 502 of a mobile communication device that, in some embodiments, may be a client node, e.g., client node 202. As will be discussed in greater detail below, the configuration of the NFC antenna 500 provides performance that is orientation independent and can support up to 90 degrees of misalignment between the antenna of the mobile device 502 and the antenna of another NFC capable device. In various embodiments of the invention, the antenna 500 is disposed at a location in the housing 504 that is at a distal position in relation to the position at which the user would normally grip the mobile device 502. In embodiments of the invention, it is possible to place the antenna 500 within the housing 504 at a position where it does not interfere with the placement of other antennas, such as Global Positioning System antennas.

Figure 6:
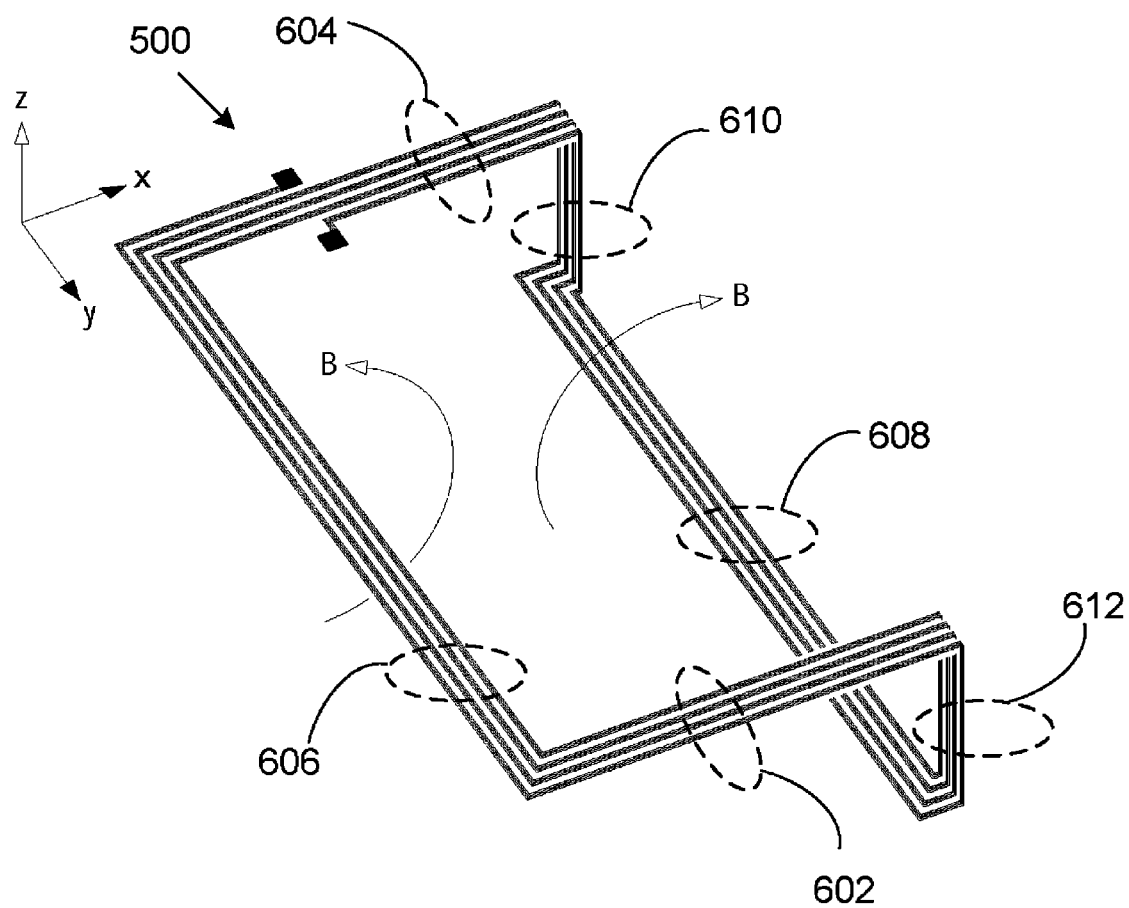
FIG. 6 is an illustration of the B-field lines of the antenna shown in FIG. 5.

FIG. 6 is an illustration of the magnetic B-field lines generated by conductor traces 606 and 608 of the antenna 500 shown in FIG. 5. As can be seen, the conductor traces of the antenna 500 are oriented in mutually perpendicular planes. For example conductor traces 602 and 604 are oriented substantially parallel to the x-axis and are perpendicular to the y-z plane; conductor traces 606 and 608 are oriented substantially parallel to the y-axis and are perpendicular to the x-z plane; and conductor traces 610 and 612 are substantially parallel to the z-axis and are perpendicular to the x-y plane. Typically, when a flat loop antenna is excited, a current flow in the wire generates B-fields that are perpendicular to its surface. As will be understood by those of skill in the art, these fields curl in a closed circle. Although not explicitly shown in FIG. 6, the conductor traces 602, 604, 610 and 612 each generate magnetic fields in accordance with the well-known "right hand rule." When the antenna is folded as shown in FIG. 6 and, although no complete loops are formed in any of the planes, the portion of the currents flowing in each of the x-y and the y-z planes are enough to generate magnetic fields perpendicular to both planes. This, in effect, enables the antenna to communicate with an NFC-capable device regardless of the angle between the two devices.

Figure 7A:
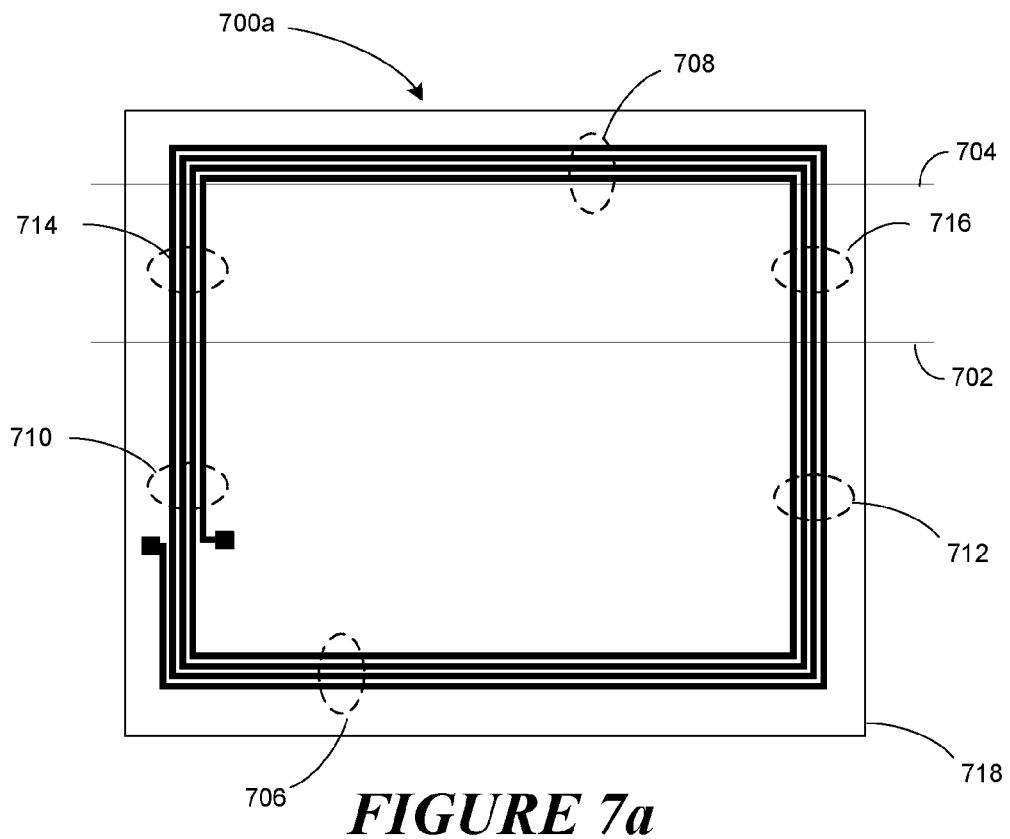
FIGS. 7*a-d* illustrate embodiments of the antenna of FIG. 5 in a flat configuration showing the folding lines to fold the various embodiment of the antenna into the configuration shown in FIG. 5, including embodiments with ferrite sheet components as described herein.

FIG. 7a is an illustration of an antenna 700a corresponding generally to the antenna 500 of FIG. 5, but in a flat configuration showing the folding lines identifying the locations 702 and 704 for folding the antenna 700a into the configuration shown in FIG. 5. Since the antenna 700a is folded only along one dimension (1-D), it can be manufactured using polyimide-based flexible printed circuits (FPC) fabricated on a flexible polymer sheet that can be easily folded into its three-dimensional shape shown in FIG. 5. The antenna 700a shown in FIG. 7a comprises at least one trace configured to provide a plurality of nested rectangular conductive antenna traces to provide a generally rectangular antenna 700a as shown in FIG. 7a. Prior to folding to the configuration shown in FIG. 5, antenna conductive trace sections 706 and 708 of FIG. 7a correspond to sections 506 and 508 shown in FIG. 5. Likewise, sections 710 and 712 and correspond to sections 510 and 512, respectively, of FIG. 5, and sections 714 and 716 correspond to sections 514 and 516 of FIG. 5. In the embodiments shown in FIGS. 7a-d, the antenna traces may be disposed on a flexible polymer sheet 718 shown in FIG. 7a and FIGS. 7a-d.

Figure 7B:
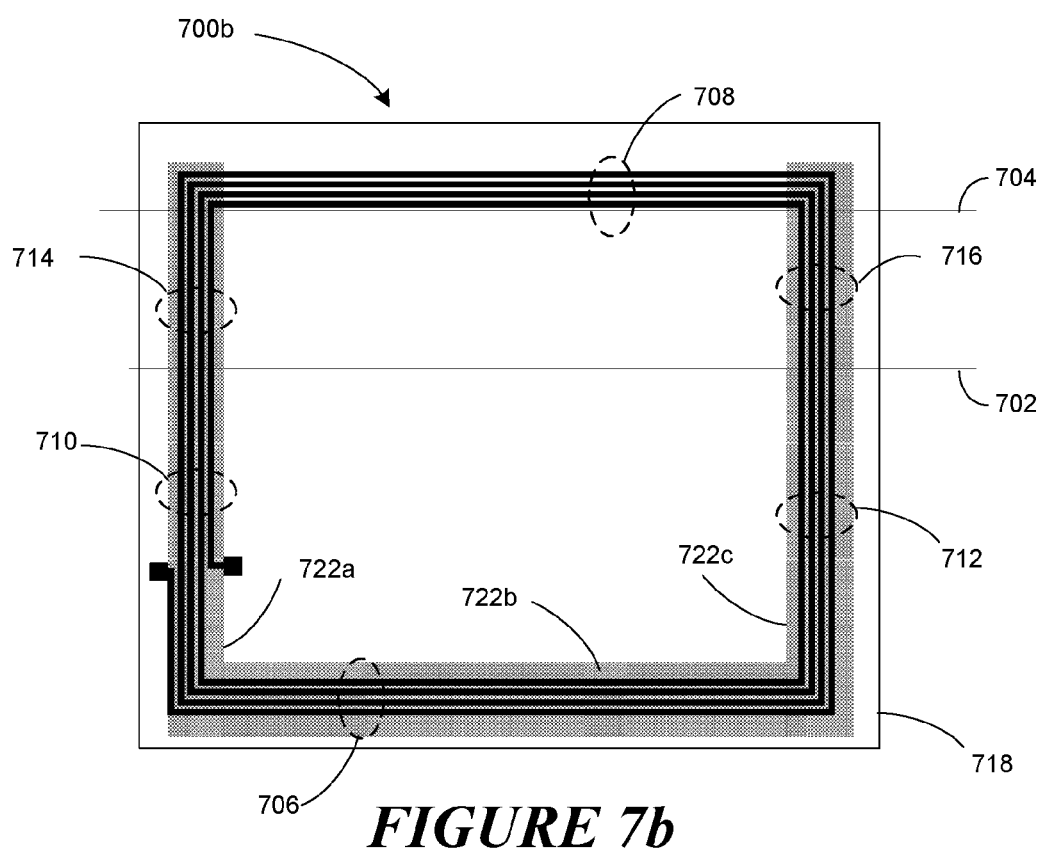
Figure 7C:
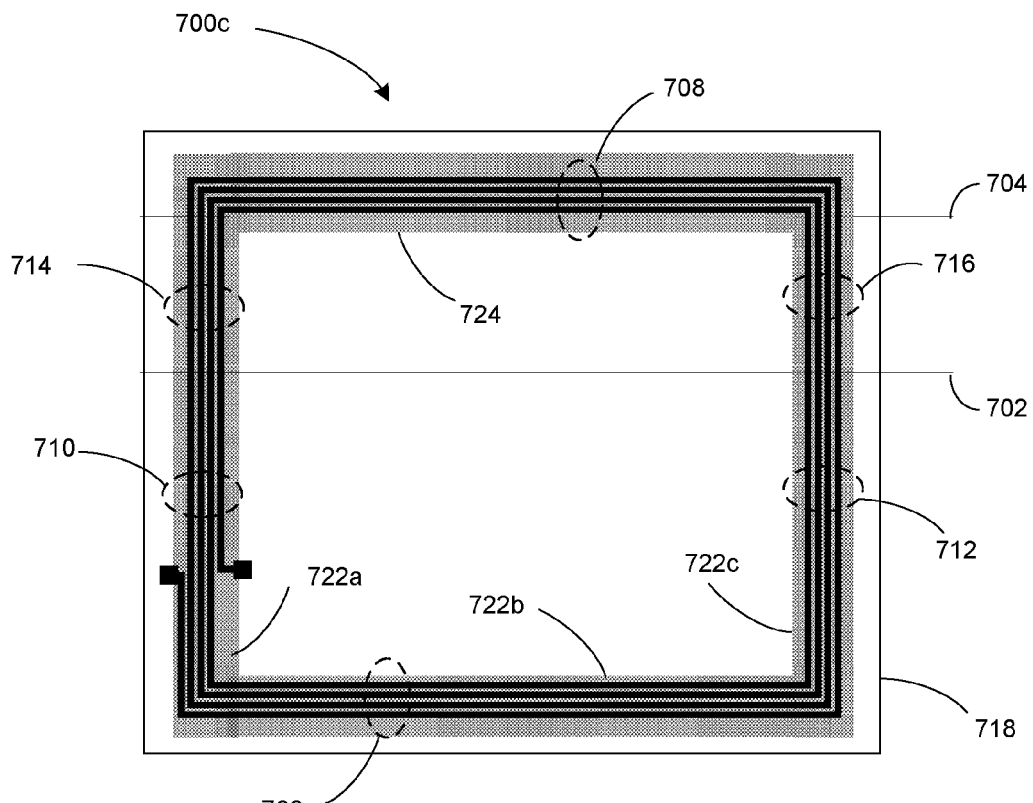
Figure 7D:
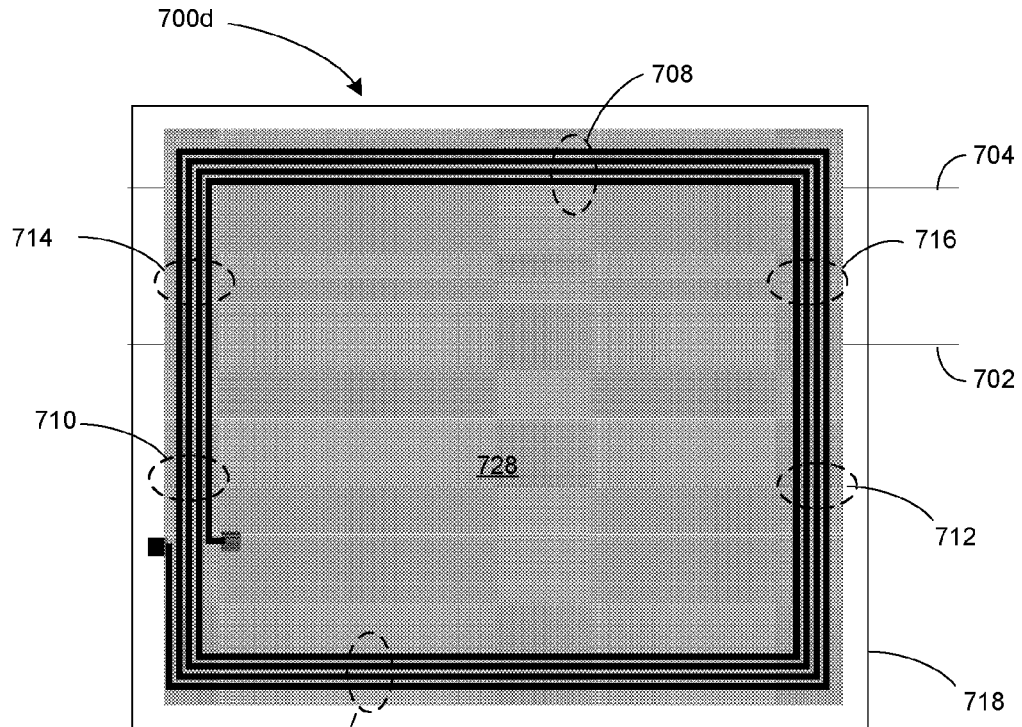

The embodiment of the antenna 700a shown in FIG. 7a comprises the conductive antenna trace sections disposed on the flexible polymer sheet, as discussed above, without any ferrite sheet. In the embodiment show in FIG. 7b, however, the antenna 700b comprises a generally U-shaped ferrite disposed on the flexible polymer sheet. The U-shaped ferrite sheet comprises ferrite sheet member 722a disposed proximate to antenna conductive trace sections 710 and 714. Ferrite sheet member 722b is disposed proximate to antenna conductive trace section 706 and ferrite sheet member 722c is disposed proximate to antenna conductive trace sections 712 and 716. FIG. 7c shows an embodiment of an antenna 700c further comprising a ferrite sheet member 724 disposed proximate to antenna conductive trace section 708. FIG. 7d is an illustration of an antenna 700d comprising a generally rectangular ferrite sheet 728 disposed proximate to all of the conductive antenna traces. In an alternative embodiment of the antenna 700d, the rectangular ferrite sheet 728 may be disposed proximate to a subset of the antenna traces. For example, the ferrite sheet may be disposed under conductive trace sections 706, 710 and 712, but not under conductive trace sections 708, 714, and 716. Those of skill in the art will recognize that the antenna configurations shown in FIGS. 7a-c provide enhanced antenna performance, while leaving a portion in the interior of antennas 700a-c available for other functionalities, such as speakers and camera sensors.

Figure 8A:
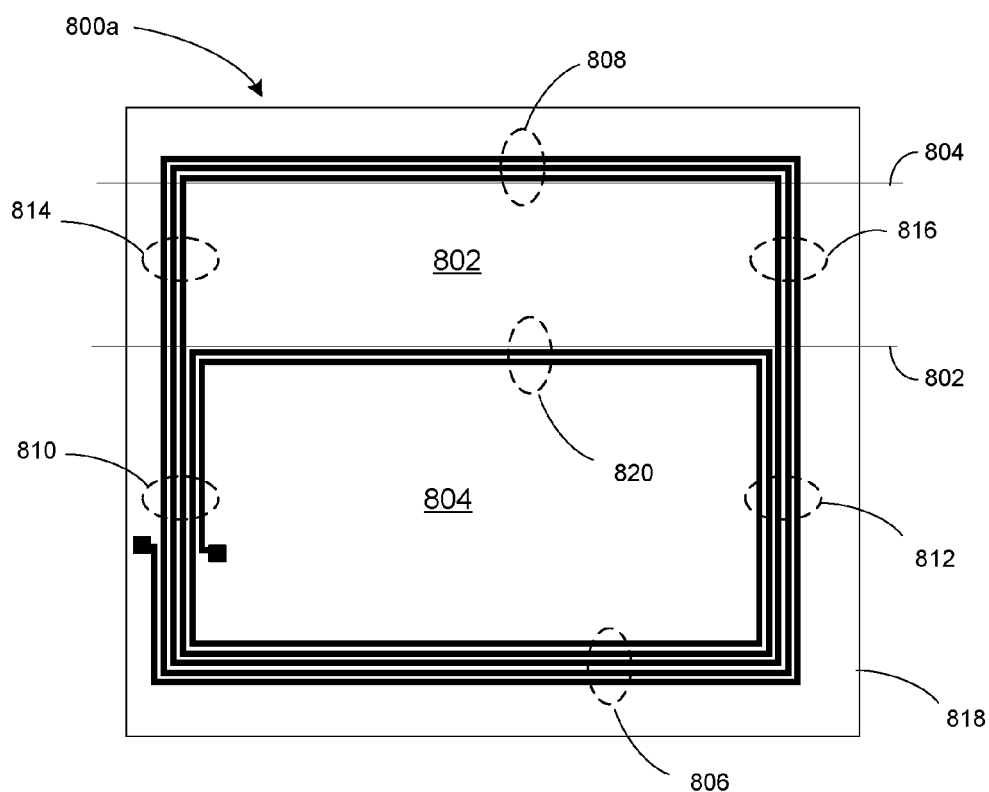
FIGS. 8*a-d* is an illustration of another embodiment of an NFC comprising a smaller second loop embedded within a larger loop.

FIG. 8a is an illustration of an alternate embodiment of an NFC antenna 800a comprising a larger loop 802 having a smaller loop 804 embedded therein. In this variation, the smaller loop 804 is embedded in the larger loop 802 to increase the intensity of the magnetic field B over the area within the smaller loop 804. In various embodiments, the antennas 800*a*, and 800*b-d* discussed below, can be folded at fold lines 802 and 804 to provide a configuration similar to that shown in FIG. 5. Prior to folding to the configuration shown in FIG. 5, antenna conductive trace sections 806 and 808 of FIG. 8*a* correspond to sections 506 and 508 shown in FIG. 5. Likewise, sections 810 and 812 and correspond to sections 510 and 512, respectively, of FIG. 5, and sections 814 and 816 correspond to sections 514 and 516 of FIG. 5. In the embodiments shown in FIGS. 8*a-d*, the antenna traces may be disposed on a flexible polymer sheet 818 shown in FIGS. 8*a-d*.

Figure 8B:
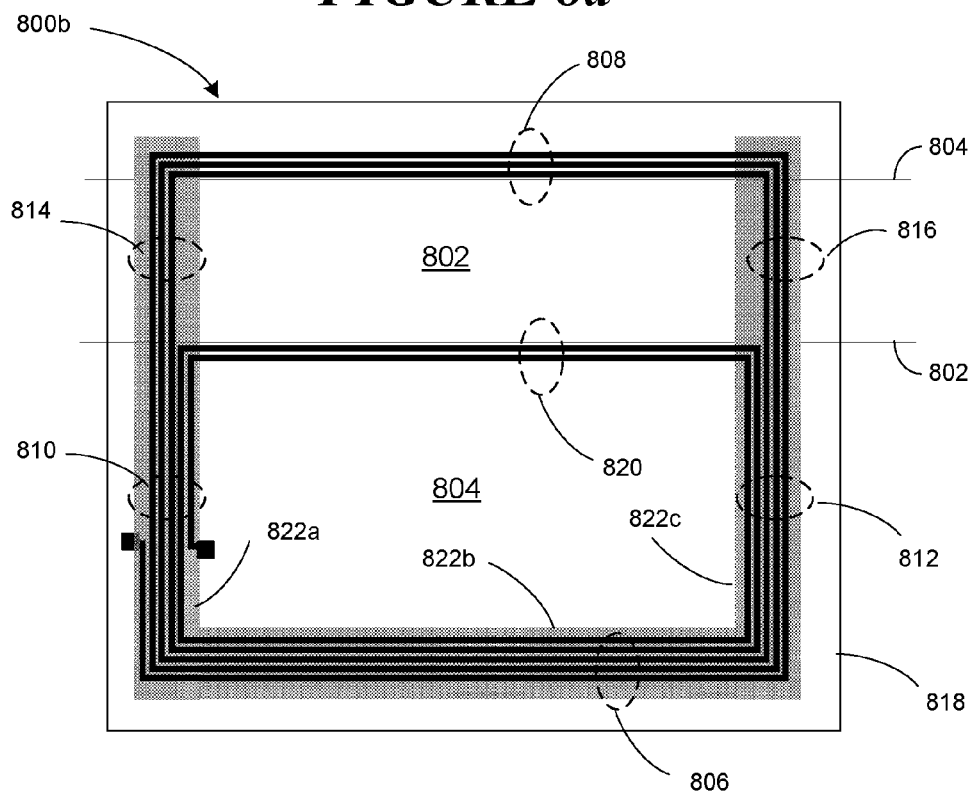
Figure 8C:
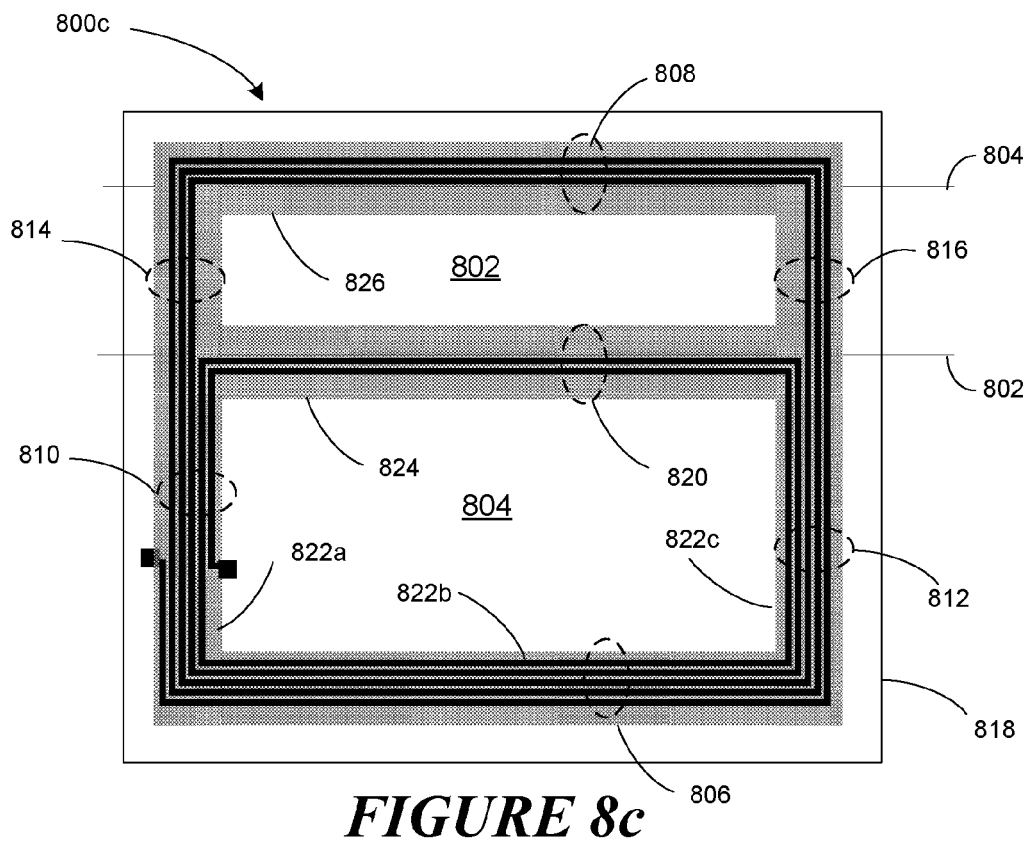
Figure 8D:
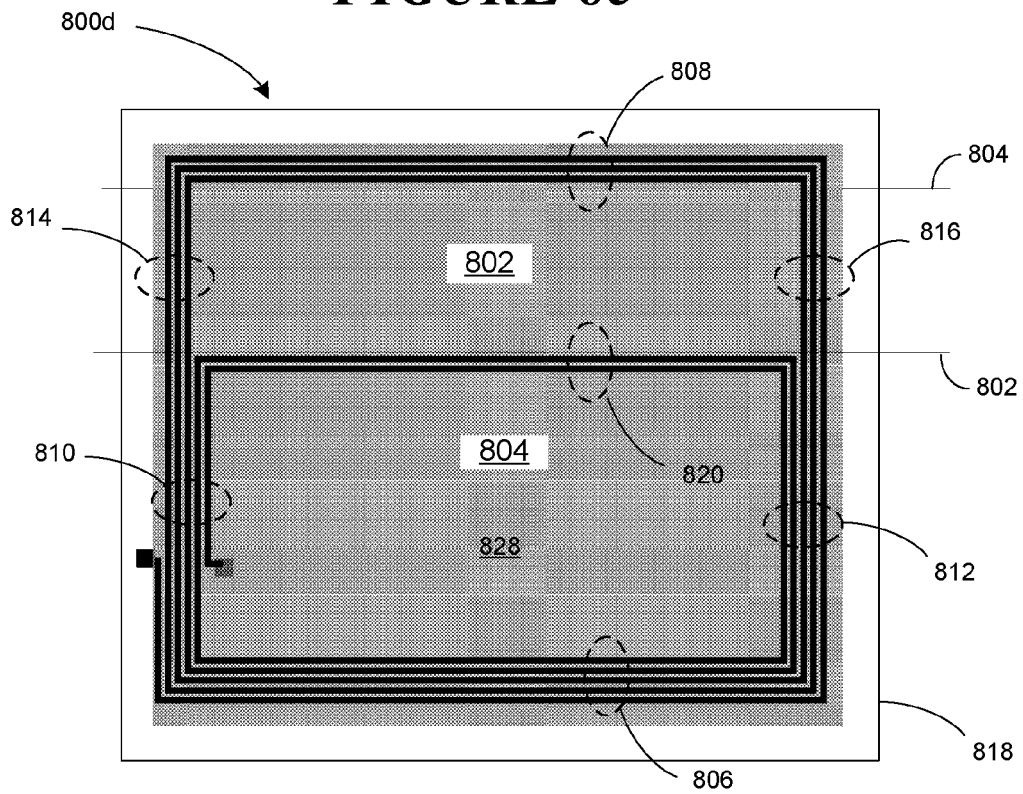

The embodiment of the antenna 800*a* shown in FIG. 8*a* comprises the conductive antenna trace sections disposed on the flexible polymer sheet, as discussed above, without any ferrite sheet. In the embodiment show in FIG. 8*b*, however, the antenna 800*b* comprises a generally U-shaped ferrite disposed on the flexible polymer sheet. The U-shaped ferrite sheet comprises ferrite sheet member 822*a* disposed proximate to antenna conductive trace sections 810 and 814. Ferrite sheet member 822*b* is disposed proximate to antenna conductive trace section 806 and ferrite sheet member 822*c* is disposed proximate to antenna conductive trace sections 812 and 816. FIG. 8*c* shows an embodiment of an antenna 800*c* further comprising a ferrite sheet member 824 disposed proximate to antenna conductive trace section 820 and a ferrite sheet member 826 disposed proximate to conductive antenna trace section 808. FIG. 8*d* is an illustration of an antenna 800*d* comprising a generally rectangular ferrite sheet disposed proximate to all of the conductive antenna traces. In an alternative embodiment of the antenna 800*d*, the rectangular ferrite sheet 828 may be disposed proximate to a subset of the antenna traces. For example, the ferrite sheet may be disposed under conductive trace sections 806, 810 and 812, but not under conductive trace sections 808, 814, and 816. Those of skill in the art will recognize that the antenna configurations shown in FIGS. 8*b-c* provide enhanced antenna performance, while leaving portions within loops 802 and 804 available for other functionalities, such as speakers and camera sensors.

FIG. 9 is an illustration of an antenna matching circuit 900 that can be used to couple embodiments of the antennas disclosed herein. The matching capacitor 902 is coupled in parallel to an antenna 904. The capacitor 902 and the antenna 904 are further coupled in series with a capacitor 906. Those of skill in the art will appreciate that the capacitance values of the capacitors for the matching circuit can be selected for a specific application and empirical tuning can be used to optimize the performance of the antenna 904.

FIG. 10 shows an embodiment of an NFC antenna 1000 disposed on the case 1004 of a mobile wireless device 1006. In the configuration shown in FIG. 10, antenna conductive trace sections 1008 and 1010 correspond to sections 506 and 508 shown in FIG. 5. Likewise, sections 1012 and 1014 and correspond to sections 510 and 512, and sections 1016 and 1018 correspond to sections 514 and 516 of FIG. 5. Any of the antenna configurations discussed hereinabove in connection with FIGS. 6*a-d* and 8*a-d*, can be configured as shown in FIG. 10 with the respective conductive antenna trace sections corresponding to sections 1006 and 1008 having an arched configuration. The magnetic field performance for the respective antenna trace sections shown in FIG. 10 will be substantially similar to those discussed above in connection with FIG. 6.

Although the described exemplary embodiments disclosed herein are described with reference to managing device-to-device communication sessions in a wireless-enabled communication environment, the present invention is not necessarily limited to the example embodiments which illustrate inventive aspects of the present invention that are applicable to a wide variety of authentication algorithms. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. An antenna, comprising:
    a conductor operable to generate a magnetic field when coupled to a source of electric current, wherein said conductor is formed in a rectangular configuration comprising a plurality of nested rectangles with multiple parallel portions of said conductor on each side of said rectangular configuration; and
    a housing having positioned thereon first, second and third portions of said rectangular configuration, the first and second portions encompassing respective entire opposing sides of the rectangular configuration, with the first portion encompassing more of said rectangular configuration of conductors than said second portion, the first portion being positioned in a first plane of the housing and the second portion being positioned in a second plane that is spaced from and substantially parallel to the first plane, the third portion of said multiple parallel portions encompassing different opposing sides of the rectangular configuration than said first and second portions, the third portion being further positioned in a third plane that is substantially perpendicular to said first plane and said second plane, the first portion, second portion and said third portion constituting an entirety of said rectangular configuration and said rectangular configuration generating said magnetic field in at least two perpendicular directions.

2. The antenna of claim 1, wherein said conductor is formed on a flexible polymer printed circuit substrate.

3. The antenna of claim 2, wherein said antenna further comprises a ferrite sheet with portions of said conductor disposed in proximity to said ferrite sheet.

4. The antenna of claim 3, wherein said second portion of said parallel portions of said conductor are formed in an arched configuration disposed in said second plane.

5. The antenna of claim 1, wherein said antenna is disposed within the housing of a mobile device.

6. The antenna of claim 1, wherein said antenna is coupled to a mobile device by an antenna matching circuit, wherein said matching circuit comprises a first capacitor in parallel with said antenna and a second capacitor in series with the combination of the parallel combination of said first capacitor and said antenna.

7. A method of fabricating an antenna, comprising:
    fabricating a conductor operable to generate a magnetic field when coupled to a source of electric current, wherein said conductor is formed in a rectangular configuration comprising a plurality of nested rectangles with multiple parallel portions of said conductor on each side of said rectangular configuration; and positioning on a portion first, second and third portions of said rectangular configuration, the first and second portions encompassing respective entire opposing sides of the rectangular configuration, with the first portion encompassing more of said rectangular configuration of conductors than said second portion, the first portion being positioned in first plane of the housing and the second portion being positioned in a second plane that is spaced from and substantially parallel to the first plane, the third portion of said multiple parallel portions of said conductor encompassing different opposing sides of the rectangular configuration than said first and second portions, the third portion being further positioned in a third plane that is substantially perpendicular to said first plane and said second plane, the first portion, second portion and said third portion constituting an entirety of said rectangular configuration and said rectangular configuration generating said magnetic field in at least two perpendicular directions.

8. The method of claim 7, wherein said conductor is formed on a flexible polymer printed circuit substrate.

9. The method of claim 8, wherein said antenna further comprises a ferrite sheet with portions of said conductor disposed in proximity to said ferrite sheet.

10. The method of claim 9, wherein said second portion of said parallel portions of said conductor are formed in an arched configuration disposed in said second plane.

11. The method of claim 7, wherein said antenna is disposed within the housing of a mobile device.

12. The method of claim 7, wherein said antenna is coupled to a mobile device by an antenna matching circuit, wherein said matching circuit comprises a first capacitor in parallel with said antenna and a second capacitor in series with the combination of the parallel combination of said first capacitor and said antenna.

13. A mobile device comprising:
a housing;
a conductor operable to generate a magnetic field when coupled to a source of electric current, wherein said conductor is formed in a rectangular configuration comprising a plurality of nested rectangles with multiple parallel portions of said conductor on each side of said rectangular configuration; and the housing having positioned thereon first, second and third portions of said rectangular configuration, the first and second portions encompassing respective entire opposing sides of the rectangular configuration, with the first portion encompassing more of said rectangular configuration of conductors than said second portion, the first portion being positioned in a first plane of the housing and the second portion being positioned in a second plane that is spaced from and substantially parallel to the first plane, the third portion of said multiple parallel portions of said conductor encompassing different opposing sides of the rectangular configuration than said first and second portions, the third portion being further positioned in a third plane that is substantially perpendicular to said first plane and said second plane, the first portion, second portion and said third portion constituting an entirety of said rectangular configuration and said rectangular configuration generating said magnetic field in at least two perpendicular direction.

14. The mobile device of claim 13, wherein said conductor is formed on a polymer flexible printed circuit substrate.

15. The mobile device of claim 14, wherein said antenna further comprises a ferrite sheet with portions of said conductor disposed in proximity to said ferrite sheet.

16. The mobile device of claim 15, wherein said second portion of said parallel portions of said conductor are formed in an arched configuration disposed in said second plane.

17. The mobile device of claim 13 wherein said antenna is disposed within the housing.

18. The mobile device of claim 13, wherein said antenna is coupled to the mobile device by an antenna matching circuit, wherein said matching circuit comprises a first capacitor in parallel with said antenna and a second capacitor in series with the combination of the parallel combination of said first capacitor and said antenna.

* * * * *

UNITED STATES PATENT AND TRADEMARK OFFICE
CERTIFICATE OF CORRECTION

PATENT NO.        : 9,478,863 B2
APPLICATION NO.   : 14/127570
DATED             : October 25, 2016
INVENTOR(S)       : Houssam Kanj et al.

It is certified that error appears in the above-identified patent and that said Letters Patent is hereby corrected as shown below:

In the Claims

Column 13, Line 3, In Claim 7, please delete "portion" and insert --housing--.

Column 14, Line 24, In Claim 13, please delete "direction" and insert --directions--.

Signed and Sealed this
Twentieth Day of December, 2016

Michelle K. Lee
*Director of the United States Patent and Trademark Office*